United States Patent
Tsuchida et al.

(10) Patent No.: US 8,315,494 B2
(45) Date of Patent: Nov. 20, 2012

(54) OPTICAL FIBER

(75) Inventors: Yukihiro Tsuchida, Tokyo (JP); Kazunori Mukasa, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/422,937

(22) Filed: Mar. 16, 2012

(65) Prior Publication Data
US 2012/0177333 A1 Jul. 12, 2012

Related U.S. Application Data

(63) Continuation of application No. PCT/JP2011/066462, filed on Jul. 20, 2011.

(30) Foreign Application Priority Data
Sep. 3, 2010 (JP) .................................. 2010-198257

(51) Int. Cl.
G02B 6/036 (2006.01)
G02B 6/028 (2006.01)

(52) U.S. Cl. ........ 385/127; 385/123; 385/124; 385/125; 385/126

(58) Field of Classification Search .................. 385/123, 385/124, 125, 126, 127, 128, 141
See application file for complete search history.

(56) References Cited

U.S. PATENT DOCUMENTS
6,785,453 B1 * 8/2004 Matsuo et al. ................. 385/123
2008/0279517 A1 11/2008 Bickham et al.
2012/0134636 A1 5/2012 Tsuchida et al.
2012/0141078 A1 6/2012 Mukasa et al.
2012/0177333 A1 * 7/2012 Tsuchida et al. .............. 385/124

FOREIGN PATENT DOCUMENTS
JP 2005-208268 8/2005
JP 2006-078543 3/2006
JP 2009-151253 7/2009
JP 2010-527033 8/2010

OTHER PUBLICATIONS

Kato, Takatoshi, et al. Dispersion Shifted Fiber for WDM Transmission, vol. 96, No. 335. Nov. 1, 1996. pp. 43-48. (with English abstract).
S. Matsuo, et al., "Bend-Insensitive and Low-Splice-Loss Optical Fiber for Indoor Wiring in FTTH", OFC 2004, Th13.
M. B. Astruc, et al., "Trench-Assisted Profiles for Large-Effective-Area Single-Mode Fibers", ECOC 2008, MO.4.B.1.
International Search Report issued Aug. 16, 2011 in PCT/JP2011/066462.

* cited by examiner

*Primary Examiner* — Brian Healy
(74) *Attorney, Agent, or Firm* — Oblon, Spivak, McClelland, Maier & Neustadt, L.L.P.

(57) ABSTRACT

An optical fiber includes a center core portion; an inner core layer formed around an outer circumference of the center core portion, a refractive index of which is less than that of the center core portion; an outer core layer formed around an outer circumference of the inner core layer, a refractive index of which is less than that of the inner core layer; and a cladding portion formed around an outer circumference of the outer core layer. A refractive index of the cladding portion is substantially equal to that of the inner core layer. At a wavelength of 1550 nm, an effective core area is equal to or larger than 130 μm$^2$ and a bending loss is equal to or less than 100 dB/m when the optical fiber is bent with a diameter of 20 mm. A cable cut-off wavelength is equal to or less than 1530 nm.

6 Claims, 13 Drawing Sheets

FIG.5

| | 2a | Δ1 | Δ3 | Ra2 | Ra3 | Aeff | BENDING LOSS | CONFINEMENT LOSS |
|---|---|---|---|---|---|---|---|---|
| | [μm] | [%] | [%] | | | [μm²] | [dB/m] | [dB/m] |
| CALCULATION EXAMPLE 1 | 11 | 0.18 | -0.3 | 2.5 | 3.5 | 147 | 4.81E+00 | 7.37E+01 |
| CALCULATION EXAMPLE 2 | 11 | 0.20 | -0.3 | 2.5 | 3.5 | 135 | 1.89E+00 | 5.41E+01 |
| CALCULATION EXAMPLE 3 | 11 | 0.18 | -0.20 | 2.5 | 3.5 | 149 | 1.50E+01 | 2.39E+02 |
| CALCULATION EXAMPLE 4 | 11 | 0.20 | -0.20 | 2.5 | 3.5 | 136 | 5.69E+00 | 1.76E+02 |
| CALCULATION EXAMPLE 5 | 11 | 0.20 | -0.1 | 2.5 | 4.5 | 137 | 2.74E+00 | 7.58E+01 |
| CALCULATION EXAMPLE 6 | 11 | 0.17 | -0.3 | 2.5 | 3.5 | 148 | 5.08E+00 | 7.54E+01 |
| CALCULATION EXAMPLE 7 | 11 | 0.19 | -0.3 | 2.5 | 3.5 | 140 | 3.02E+00 | 6.24E+01 |
| CALCULATION EXAMPLE 8 | 11 | 0.19 | -0.20 | 2.5 | 3.5 | 141 | 9.27E+00 | 2.03E+02 |
| CALCULATION EXAMPLE 9 | 11.3 | 0.22 | -0.3 | 2.5 | 3.5 | 130 | 5.42E-01 | 2.60E+01 |
| CALCULATION EXAMPLE 10 | 11.4 | 0.22 | -0.3 | 2.5 | 3.5 | 131 | 4.88E-01 | 2.23E+01 |
| CALCULATION EXAMPLE 11 | 11.5 | 0.20 | -0.3 | 2.5 | 3.5 | 140 | 1.05E+00 | 2.82E+01 |
| CALCULATION EXAMPLE 12 | 11.5 | 0.20 | -0.20 | 2.5 | 3.5 | 141 | 3.27E+00 | 9.56E+01 |
| CALCULATION EXAMPLE 13 | 11.5 | 0.20 | -0.1 | 2.5 | 3.5 | 141 | 1.42E+01 | 4.68E+02 |
| CALCULATION EXAMPLE 14 | 11.5 | 0.20 | -0.1 | 2.5 | 4.5 | 141 | 1.58E+00 | 3.55E+01 |
| CALCULATION EXAMPLE 15 | 11.8 | 0.24 | -0.20 | 2.3 | 3.3 | 130 | 5.42E-01 | 3.60E+01 |
| CALCULATION EXAMPLE 16 | 11.8 | 0.24 | -0.20 | 2.5 | 3.5 | 130 | 4.11E-01 | 2.27E+01 |
| CALCULATION EXAMPLE 17 | 11.8 | 0.24 | -0.20 | 2.7 | 3.5 | 130 | 6.40E-01 | 3.70E+01 |
| CALCULATION EXAMPLE 18 | 12 | 0.22 | -0.20 | 2.5 | 3.5 | 138 | 8.22E-01 | 2.80E+01 |
| CALCULATION EXAMPLE 19 | 12 | 0.20 | -0.20 | 2.5 | 3.5 | 145 | 1.98E+00 | 4.97E+01 |
| CALCULATION EXAMPLE 20 | 12 | 0.20 | -0.1 | 2.5 | 3.5 | 146 | 8.96E+00 | 2.64E+02 |
| CALCULATION EXAMPLE 21 | 12 | 0.20 | -0.20 | 2.5 | 3.3 | 148 | 5.26E+00 | 3.40E+01 |
| CALCULATION EXAMPLE 22 | 12 | 0.23 | -0.15 | 2.0 | 3.47 | 133 | 4.33E-01 | 2.25E+01 |
| CALCULATION EXAMPLE 23 | 12.2 | 0.20 | -0.20 | 2.7 | 3.5 | 147 | 2.58E+00 | 5.95E+01 |
| CALCULATION EXAMPLE 24 | 12.2 | 0.20 | -0.20 | 2.7 | 3.7 | 147 | 1.25E+00 | 2.48E+01 |
| CALCULATION EXAMPLE 25 | 12.3 | 0.20 | -0.15 | 2.0 | 3.47 | 146 | 1.28E+00 | 3.38E+01 |
| CALCULATION EXAMPLE 26 | 12.5 | 0.20 | -0.15 | 2.0 | 3.47 | 148 | 1.07E+00 | 2.49E+01 |
| CALCULATION EXAMPLE 27 | 12.5 | 0.17 | -0.1 | 2.0 | 3.3 | 161 | 1.82E+01 | 2.54E+02 |

FIG.6

| | 2a | Δ1 | Δ3 | Ra2 | Ra3 | Aeff | BENDING LOSS | CONFINEMENT LOSS |
|---|---|---|---|---|---|---|---|---|
| | [μm] | [%] | [%] | | | [μm²] | [dB/m] | [dB/m] |
| CALCULATION COMPARATIVE EXAMPLE 28 | 13 | 0.24 | -0.5 | 2.7 | 3.3 | 142 | 4.42E-02 | 5.62E-07 |
| CALCULATION COMPARATIVE EXAMPLE 29 | 13 | 0.24 | -0.5 | 3 | 3.1 | 142 | 9.15E-01 | 4.84E-06 |
| CALCULATION COMPARATIVE EXAMPLE 30 | 13 | 0.24 | -0.3 | 2.7 | 3.1 | 142 | 3.31E-01 | 1.12E-05 |
| CALCULATION COMPARATIVE EXAMPLE 31 | 13 | 0.30 | -0.3 | 2.7 | 3.1 | 129 | 1.85E-03 | 1.47E-11 |
| CALCULATION COMPARATIVE EXAMPLE 32 | 13 | 0.24 | -0.3 | 3 | 3.1 | 142 | 1.37E+00 | 5.08E-06 |
| CALCULATION COMPARATIVE EXAMPLE 33 | 13 | 0.30 | -0.3 | 3 | 3.3 | 129 | 2.67E-03 | 1.34E-11 |
| CALCULATION COMPARATIVE EXAMPLE 34 | 15 | 0.24 | -0.5 | 2.7 | 3.1 | 167 | 2.46E-02 | 9.97E-12 |
| CALCULATION COMPARATIVE EXAMPLE 35 | 15 | 0.24 | -0.3 | 3 | 3.3 | 167 | 1.02E-01 | 1.21E-11 |
| CALCULATION COMPARATIVE EXAMPLE 36 | 9 | 0.13 | -0.1 | 1.5 | 4.5 | 133 | 1.15E+02 | 7.00E+03 |
| CALCULATION COMPARATIVE EXAMPLE 37 | 9 | 0.17 | -0.05 | 1.5 | 4.5 | 129 | 2.54E+02 | 5.96E+03 |
| CALCULATION COMPARATIVE EXAMPLE 38 | 9 | 0.17 | -0.05 | 1.5 | 6.5 | 129 | 2.00E+02 | 5.15E+03 |
| CALCULATION COMPARATIVE EXAMPLE 39 | 9 | 0.17 | -0.05 | 2 | 4.5 | 140 | 2.50E+02 | 5.69E+03 |
| CALCULATION COMPARATIVE EXAMPLE 40 | 9 | 0.17 | -0.05 | 2 | 6.5 | 140 | 1.76E+02 | 5.19E+03 |
| CALCULATION COMPARATIVE EXAMPLE 41 | 11 | 0.13 | -0.05 | 1.5 | 4.5 | 167 | 2.38E+02 | 5.30E+03 |
| CALCULATION COMPARATIVE EXAMPLE 42 | 11 | 0.13 | -0.05 | 1.5 | 6.5 | 166 | 3.01E+02 | 5.29E+03 |
| CALCULATION COMPARATIVE EXAMPLE 43 | 11 | 0.13 | -0.05 | 2 | 6.5 | 182 | 3.90E+02 | 5.38E+03 |

|  | CUT-OFF WAVE-LENGTH | Aeff | BENDING LOSS | CHROMATIC DISPERSION | DISPERSION SLOPE | FIBER OUTER DIAMETER |
|---|---|---|---|---|---|---|
|  | [nm] | [$\mu m^2$] | [dB/m] | [ps/nm/km] | [ps/nm²/km] | [$\mu m$] |
| EXAMPLE 1 | 1330 | 130 | 15.6 | 19.28 | 0.062 | 186 |
| COMPARATIVE EXAMPLE 1 | 1550 | 144.7 | 11.53 | 19.10 | 0.058 | 215 |

FIG.11

| | DESIGN PARAMETER | Aeff | BENDING LOSS | CHROMATIC DISPERSION | DISPERSION SLOPE |
|---|---|---|---|---|---|
| | | [$\mu m^2$] | [dB/m] | [ps/nm/km] | [ps/nm$^2$/km] |
| CALCULATION EXAMPLE 44 | Ra2=2.5<br>Ra3=4.5<br>Δ1=0.19%<br>Δ3=-0.1%<br>2a=12μm | 150.6 | 1.27 | 19.7 | 0.063 |
| CALCULATION EXAMPLE 45 | Ra2=2.5<br>Ra3=4.5<br>Δ1=0.19%<br>Δ3=-0.1%<br>2a=12μm<br>d=2.5μm<br>L=50μm | 150.8 | 1.10 | 19.7 | 0.063 |

FIG.12

| | Aeff | BENDING LOSS | CUT-OFF WAVELENGTH | MICROBENDING LOSS |
|---|---|---|---|---|
| | [$\mu m^2$] | [dB/m] | [nm] | [dB/km] |
| EXAMPLE 2 | 154.9 | 77 | 1344 | 35.2 |
| EXAMPLE 3 | 152.5 | 64 | 1406 | 17.7 |

OPTICAL FIBER

CROSS-REFERENCE TO RELATED APPLICATIONS

This application is a continuation of PCT International Application No. PCT/JP2011/66462 filed on Jul. 20, 2011 which claims the benefit of priority from the prior Japanese Patent Applications No. 2010-198257, filed on Sep. 3, 2010; the entire contents of which are incorporated herein by reference.

BACKGROUND OF THE INVENTION

1. Field of the Disclosure

The present invention relates to an optical fiber.

2. Description of the Related Art

Along with the recent tremendous growth in Internet traffic, the power of the light transmitted through a single optical fiber has also increased; therefore, nonlinear optical phenomena in optical fibers and fiber fuses have become major problems. An effective solution to the above problems is to increase the effective core area (Aeff) of the optical fiber. However, when performing single-mode transmission at a communication waveband by using a conventional solid optical fiber that has an increased effective core area, a problem occurs in that macrobending losses and microbending losses are increased. A microbending loss is defined as an increase in the transmission loss due to a minute bend in an optical fiber that occurs, when lateral pressure is applied to the optical fiber, by fine bumps, etc., on the surface of a lateral-pressure applying object (for example, a bobbin).

To decrease the macrobending loss and the microbending loss that occur when single-mode transmission is performed with the effective core area being increased, methods are proposed that use trench refractive index profiles (Japanese Patent Application Laid-open No. 2006-78543, S Matsuo, et al., "Bend-Insensitive and Low-Splice-Loss Optical fiber for Indoor Wiring in FTTH", OFC 2004, ThI3 and M. B. Astruc, et al., "Trench-Assisted Profiles for Large-Effective-Area Single-Mode Fibers", ECOC 2008, MO.4.B.1). For example, an optical fiber is proposed in the non patent literature 2 that has an effective core area that is increased to $120 \mu m^2$ by optimizing the trench index profile.

SUMMARY OF THE INVENTION

It is an object of the present invention to at least partially solve the problems in the conventional technology.

According to an aspect of the present invention, there is provided an optical fiber includes a center core portion; an inner core layer formed around an outer circumference of the center core portion, a refractive index of which is less than that of the center core portion; an outer core layer formed around an outer circumference of the inner core layer, a refractive index of which is less than that of the inner core layer; and a cladding portion formed around an outer circumference of the outer core layer. A refractive index of the cladding portion is substantially equal to that of the inner core layer. At a wavelength of 1550 nm, an effective core area is equal to or larger than $130 \mu m^2$ and a bending loss is equal to or less than 100 dB/m when the optical fiber is bent with a diameter of 20 mm. A cable cut-off wavelength is equal to or less than 1530 nm.

The above and other objects, features, advantages and technical and industrial significance of this invention will be better understood by reading the following detailed description of presently preferred embodiment of the invention, when considered in connection with the accompanying drawings.

BRIEF DESCRIPTION OF THE DRAWINGS

FIG. 5 is a table of design parameters and optical characteristics of optical fibers of calculation examples 1 to 27;

FIG. 6 is a table of the design parameters and the optical characteristics of optical fibers of comparative calculation examples 28 to 43;

FIG. 11 is a table of the design parameters and the optical characteristics of optical fibers of calculation examples 44 and 45;

FIG. 12 is a table of the characteristics of optical fibers of Examples 2 and 3.

DETAILED DESCRIPTION OF THE INVENTION

Exemplary embodiments of an optical fiber according to the present invention will be explained in detail below with reference to the accompanying drawings. It should be noted that the present invention is not limited to the following embodiments. A cable cut-off wavelength indicates, herein, a cable cut-off wavelength ($\lambda cc$) defined in ITU-T (International Telecommunication Union) G.650.1. A bending loss, herein, indicates a macrobending loss when a fiber is bent with a diameter of 20 mm. Unless otherwise specified, terms herein are defined in ITU-TG.650.1 and measured in a certain manner described in ITU-TG.650.1.

For a further increase in the power of light transmitting through an optical fiber, an optical fiber is required in which an increase in the bending loss is further suppressed and the effective core area is increased more.

An optical fiber according to the following embodiments can transmit light at a communication waveband in a single mode, suppress an increase in the bending loss, and have a large effective core area.

Figure 1:
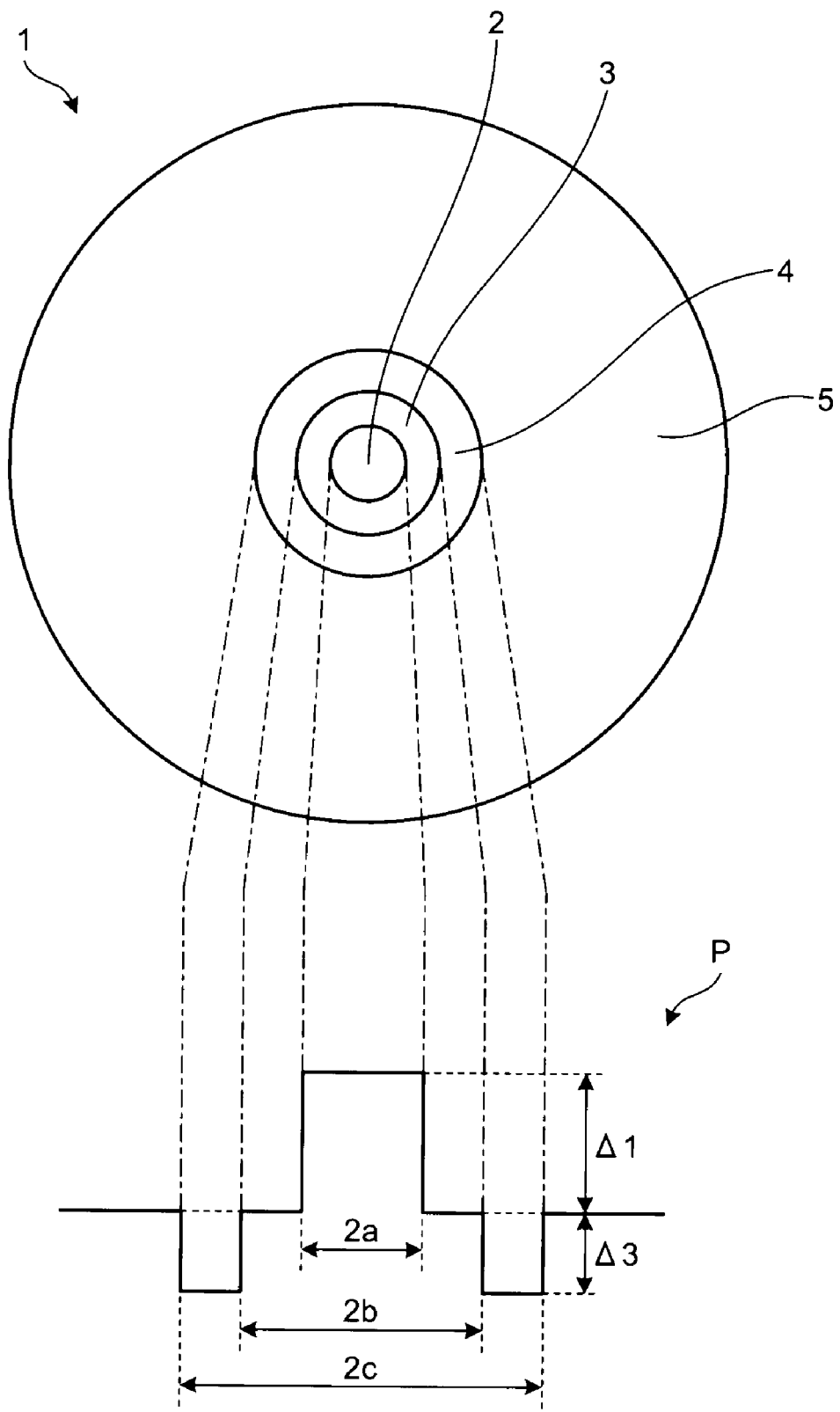
FIG. 1 is a schematic cross-sectional view of an optical fiber according to a first embodiment and a refractive index profile thereof.

FIG. 1 is a schematic cross-sectional view of an optical fiber according to a first embodiment and a refractive index profile thereof. As illustrated in FIG. 1, an optical fiber 1 according to the first embodiment is made of silica based glass and it includes a center core portion 2, an inner core layer 3 that is formed around the outer circumference of the center core portion 2, an outer core layer 4 that is formed around the outer circumference of the inner core layer 3, and a cladding portion 5 that is formed around the outer circumference of the outer core layer 4.

As illustrated in the refractive index profile P of FIG. 1, in the optical fiber 1, the refractive index of the inner core layer 3 is less than the refractive index of the center core portion 2. The refractive index of the outer core layer 4 is less than the refractive index of the inner core layer 3. The refractive index of the cladding portion 5 is equal to the refractive index of the inner core layer 3. In other words, the optical fiber 1 has a trench index profile.

The refractive index profile P is implemented by making the center core portion 2 with a pure silica glass that contains no refractive-index adjusting dopant, making the inner core layer 3 and the cladding portion 5 with a silica glass that contains a dopant, such as fluorine (F), to decrease the refractive index, and making the outer core layer 4 with a silica glass that contains a more amount of fluorine (F) than the amount of fluorine in the cladding portion 5.

Herein, as illustrated in FIG. 1, the relative refractive-index difference of the center core portion 2 to the cladding portion 5 is $\Delta 1$, and the relative refractive-index difference of the outer core layer 4 to the cladding portion 5 is $\Delta 3$. The diameter of the center core portion 2 is $2a$, the outer diameter of the inner core layer 3 is $2b$, the outer diameter of the outer core layer 4 is $2c$, b/a is Ra2, and c/a is Ra3. The diameter $2a$ of the center core portion 2 is defined as a diameter of points that have a relative refractive-index difference the half of $\Delta 1$. The outer diameter $2b$ of the inner core layer 3 is defined as a diameter of points on a boundary between the inner core layer 3 and the outer core layer 4 that have a relative refractive index the half of $\Delta 3$. The outer diameter $2c$ of the outer core layer 4 is defined as a diameter of points on a boundary between the outer core layer 4 and the cladding portion 5 that have a relative refractive index the half of $\Delta 3$.

The optical fiber 1 has the diameter $2a$ of the center core portion 2 of 11μm, $\Delta 1$ of 0.18%, $\Delta 3$ of −0.3%, Ra2 of 2.5, and Ra3 of 3.5. As a result, in the optical fiber 1, while the bending loss at a wavelength of 1550 nm is suppressed to 4.81 dB/m, the effective core area is large as 147μm². Moreover, because, in the optical fiber 1, the confinement loss at a wavelength of 1530 nm in a higher-order mode of first order is a sufficiently great value as 73.7 dB/m, light of the higher-order mode of first order with a wavelength equal to or less than 1530 nm attenuates sufficiently during transmission through the optical fiber 1. Accordingly, the cable cut-off wavelength of the optical fiber 1 becomes a value equal to or less than 1530 nm which is the short-wavelength side of the C band (1530 nm to 1565 nm) belonging to a communication waveband; therefore, the optical fiber 1 can transmit, in a single mode, light having a wavelength equal to or longer than the C band in the communication waveband.

As described above, because the optical fiber 1 has a trench index profile, increasing of the effective core area, decreasing of the bending loss, and optimizing of the cut-off wavelength to a wavelength that allows light of a communication waveband to transmit in a single mode, are simultaneously implemented.

As described above, the optical fiber 1 according to first embodiment is an optical fiber that transmits light of a communication waveband in a single mode, suppresses an increase in the bending loss, and has a large effective core area.

The optical fiber according to the present invention is not limited to the above first embodiment. For example, if an optical fiber has the structure as illustrated in FIG. 1 and has, as the design parameters, $\Delta 1$ of 0.17% to 0.24%, $\Delta 3$ of −0.3% to −0.1%, $2a$ of 11μm to 12.5μm, Ra2 of 2.0 to 2.7, and Ra3 of 3.3 to 4.5, then, in the optical fiber, the effective core area at a wavelength of 1550 nm is equal to or larger than 130μm², the bending loss at a wavelength of 1550 nm is equal to or less than 100 dB/m, and the cable cut-off wavelength is equal to or less than 1530 nm. A value of the bending loss equal to or less than 100 dB/m is preferable to practically use the optical fiber as a long-haul transmission line. The bending loss is further preferable to be a value equal to or less than 20 dB/m.

The present invention will be explained more specifically below with reference to simulation results using a finite element method.

Figure 2A:
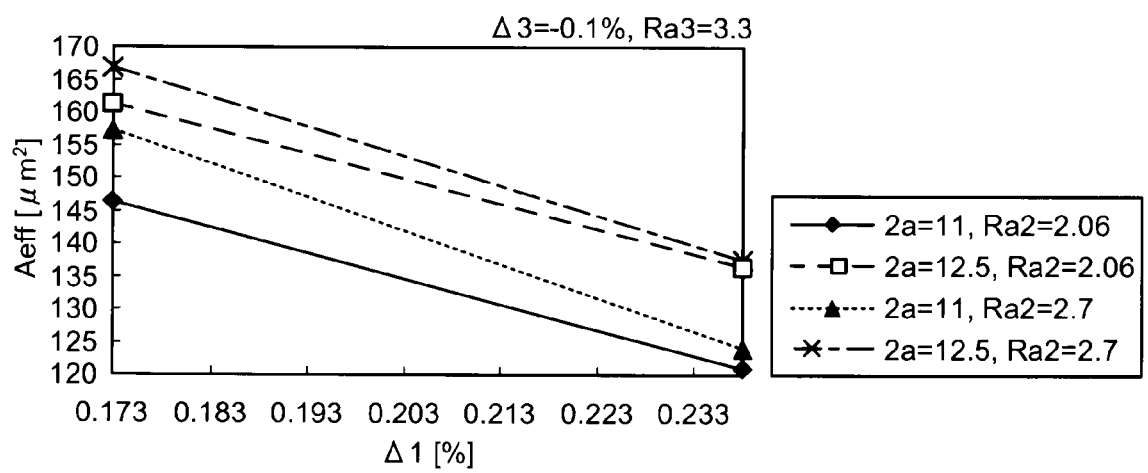
FIGS. 2A to 2D are graphs that illustrate the relation between a relative refractive-index difference $\Delta 1$ and an effective core area (Aeff) at a wavelength of 1550 nm.

Firstly, the relation is explained between $\Delta 1$ and the effective core area of an optical fiber that has the structure illustrated in FIG. 1. FIGS. 2A to 2D are graphs that illustrate the relation between $\Delta 1$ and the effective core area (Aeff) at a wavelength of 1550 nm. In FIG. 2A, $\Delta 3$ is fixed to −0.1% and Ra3 is fixed to 3.3; in FIG. 2B, $\Delta 3$ is fixed to −0.3% and Ra3 is fixed to 3.3; in FIG. 2C, $\Delta 3$ is fixed to −0.1% and Ra3 is fixed to 4.5; and in FIG. 2D, $\Delta 3$ is fixed to −0.3% and Ra3 is fixed to 4.5. The other design parameters are as follows: $2a$ is 11μm or 12.5μm and Ra2 is 2.06 or 2.7.

As illustrated in FIGS. 2A to 2D, the effective core area is increased by increasing $\Delta 1$, $2a$, Ra2, and the absolute value of $\Delta 3$. It is noted that, even when Ra3 is increased, such increase does not so much affect the effective core area.

Then, the relation is explained between $\Delta 1$ and the bending loss of an optical fiber that has the structure illustrated in FIG. 1. FIGS. 3A to 3D are graphs that illustrate the relation between $\Delta 1$ and the bending loss at a wavelength of 1550 nm. The other design parameters are set in the same manner as those of FIGS. 2A to 2D. In other words, in FIG. 3A, $\Delta 3$ is fixed to −0.1%, Ra3 is fixed to 3.3; in FIG. 3B, $\Delta 3$ is fixed to −0.3% and Ra3 is fixed to 3.3; in FIG. 3C, $\Delta 3$ is fixed to −0.1% and Ra3 is fixed to 4.5; and in FIG. 3D, $\Delta 3$ is fixed to −0.3% and Ra3 is fixed to 4.5. Moreover, $2a$ is 11μm or 12.5μm and Ra2 is 2.06 or 2.7. Regarding a value of the bending loss, "E" is a sign indicative of the exponential in decimal and, for example, "1.00E+01" indicates "$1.00 \times 10^1$".

Figure 2B:
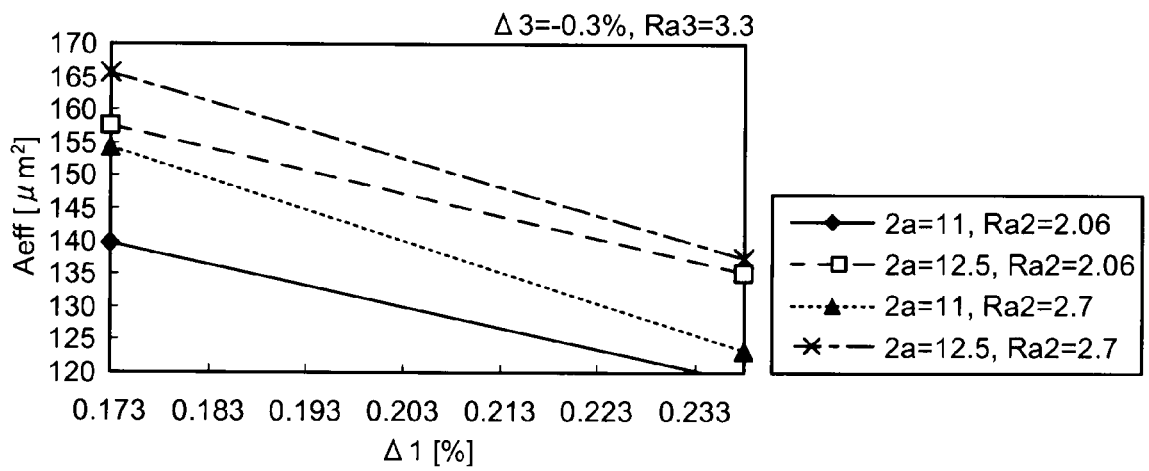
Figure 2C:
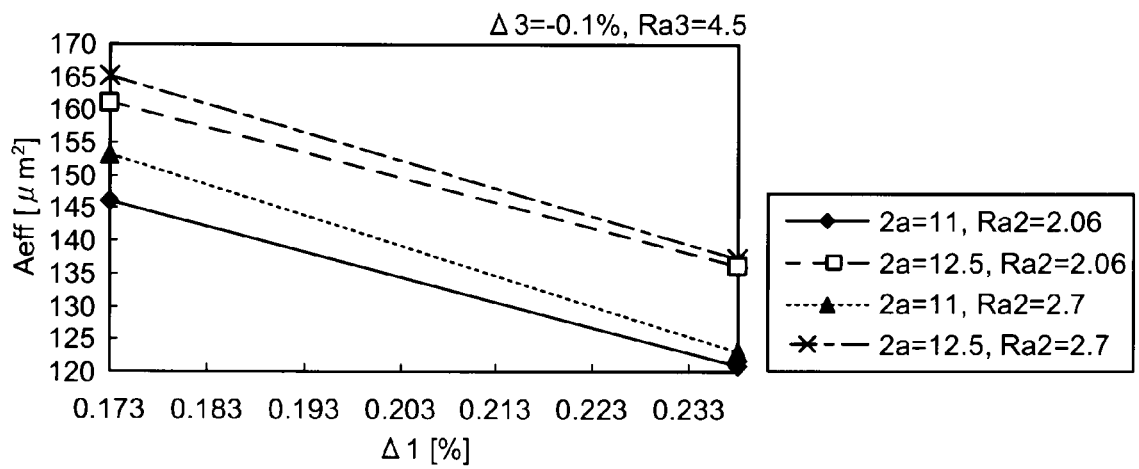
Figure 2D:
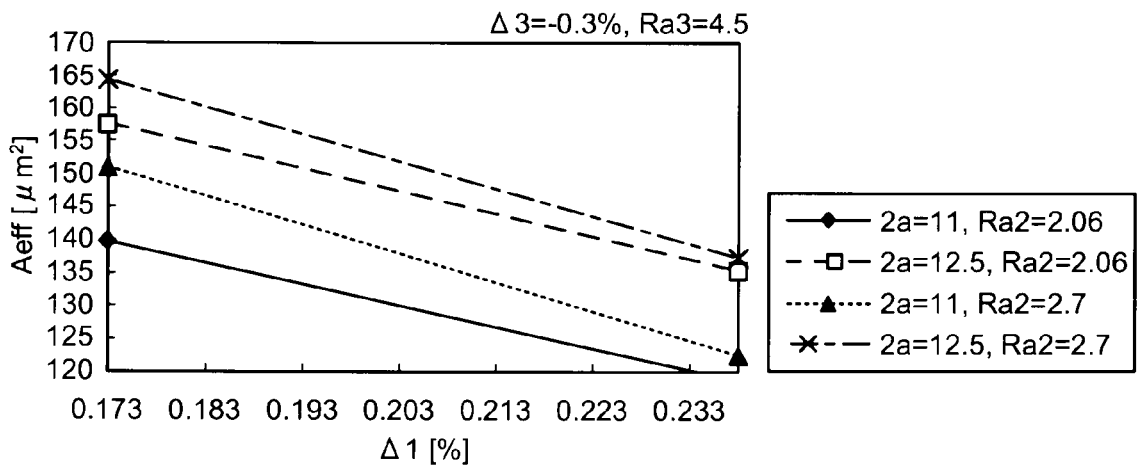
Figure 3A:
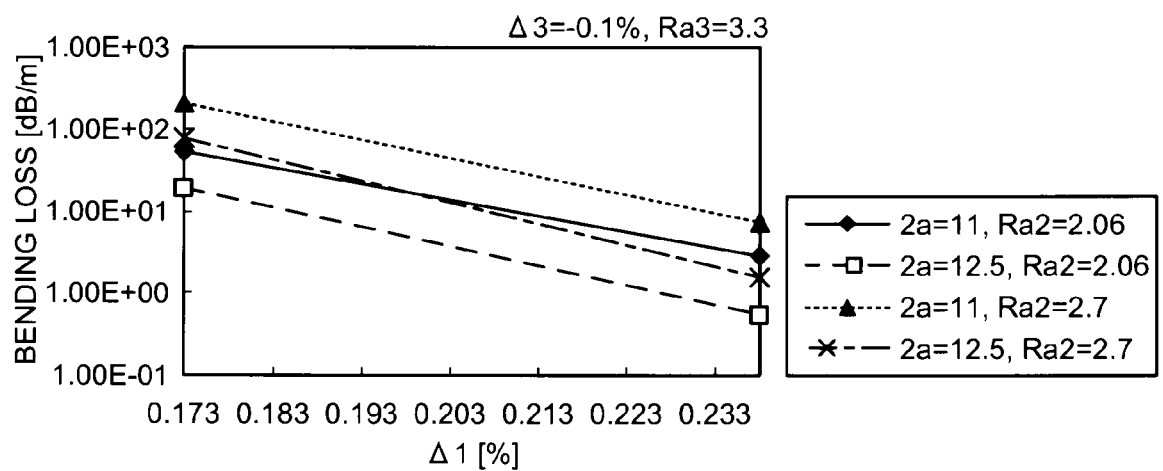
FIGS. 3A to 3D are graphs that illustrate the relation between the relative refractive-index difference $\Delta 1$ and a bending loss at a wavelength of 1550 nm.
Figure 3B:
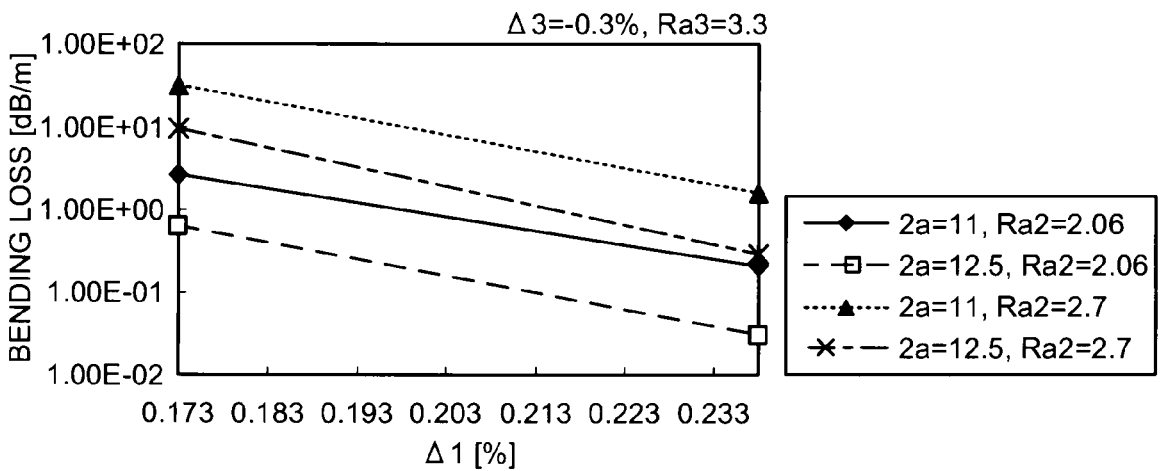
Figure 3C:
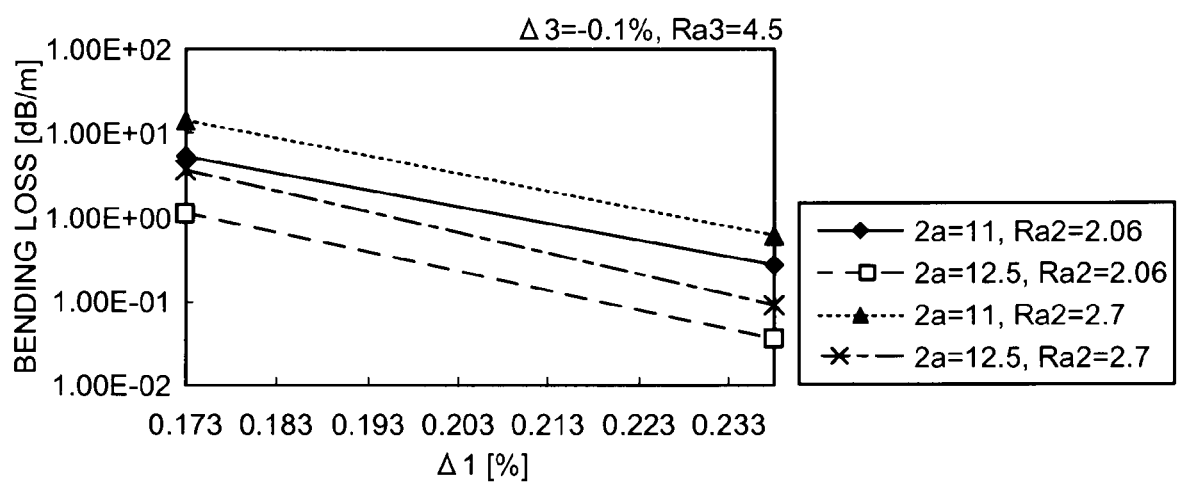
Figure 3D:
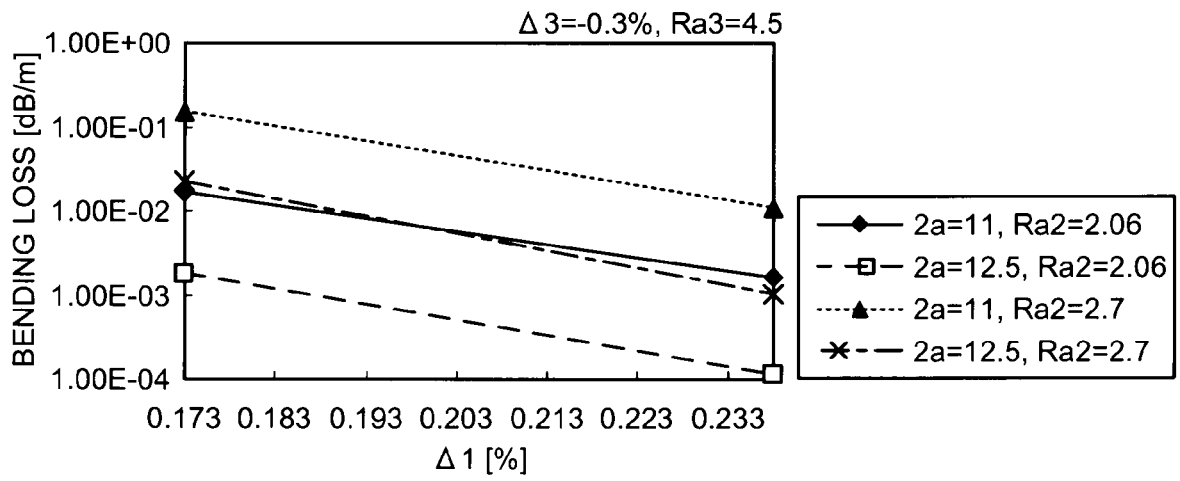
Figure 4A:
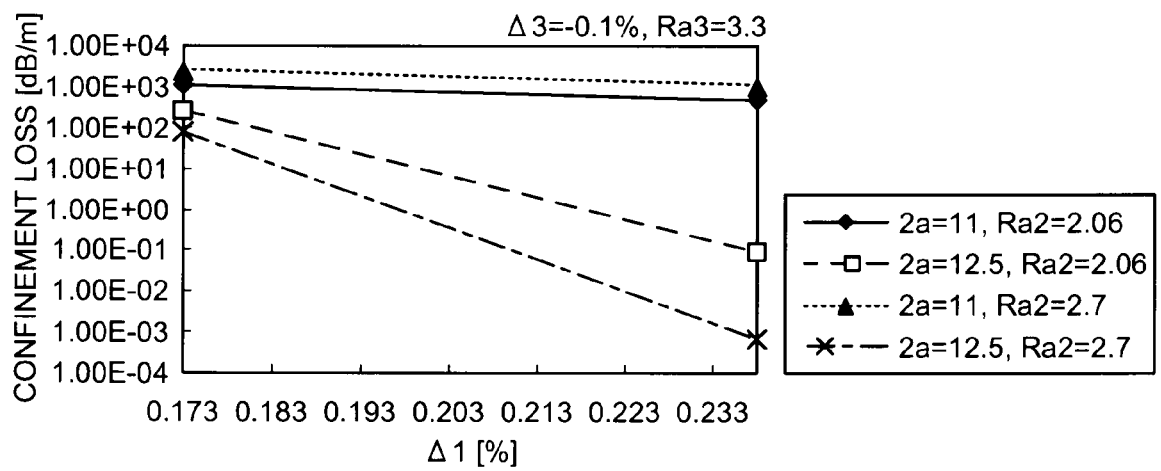
FIGS. 4A to 4D are graphs that illustrate the relation between the relative refractive-index difference $\Delta 1$ and a confinement loss of a first higher-order mode at a wavelength of 1530 nm.
Figure 4B:
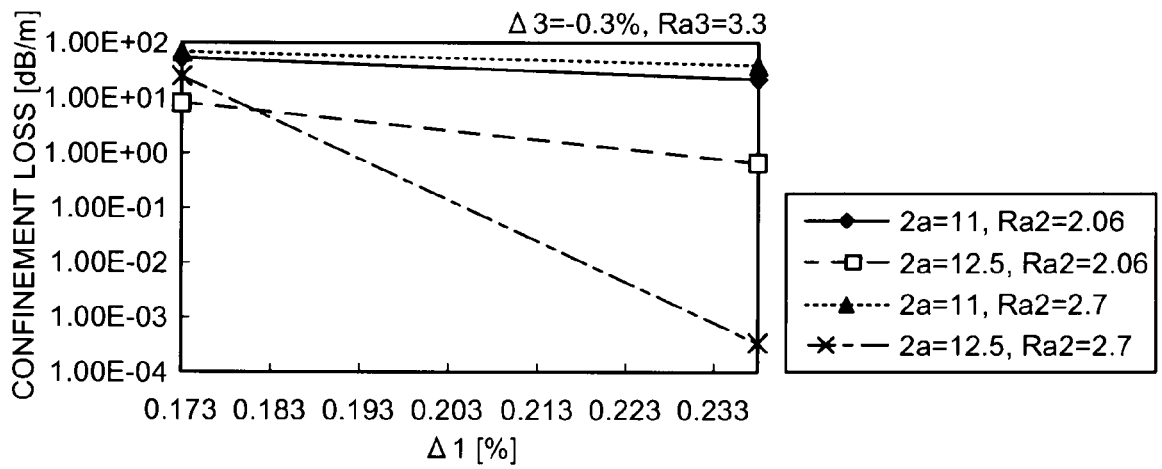
Figure 4C:
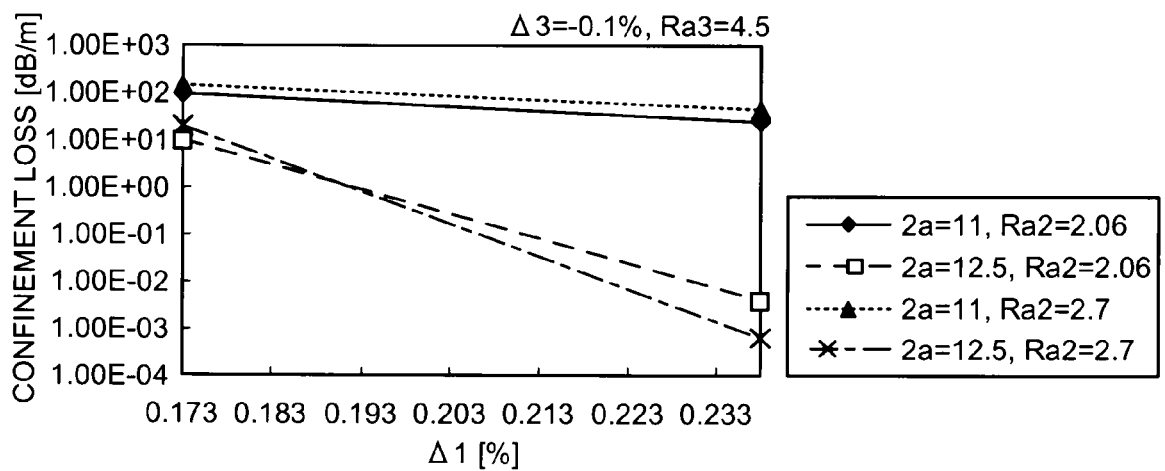
Figure 4D:
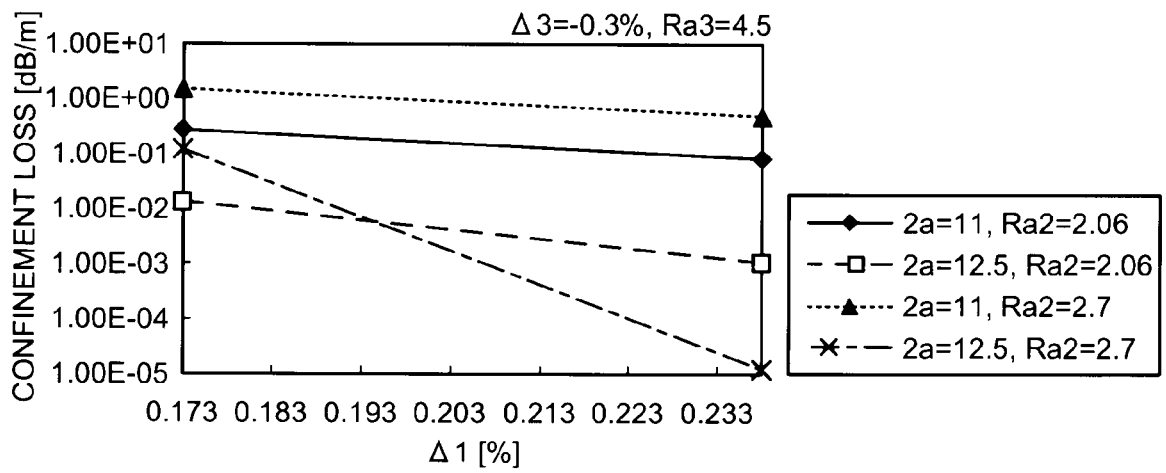

As illustrated in FIGS. 3A to 3D, the bending loss is decreased by increasing $\Delta 1$, $2a$, Ra3, and the absolute values of $\Delta 3$ or by decreasing Ra2. When FIG. 2A is compared with FIG. 2C or FIG. 2B is compared with FIG. 2D, the effective core area is not substantially changed with respect to the value of Ra3. In contrast, when FIG. 3A is compared with FIG. 3C or FIG. 3B is compared with FIG. 3D, the increase in the value of Ra3 decreases the bending loss by the order of about one or two. Therefore, usage of a trench profile enables a decrease in the bending loss, while maintaining the effective core area to be a certain level.

Then, the relation is explained between $\Delta 1$ and the confinement loss of an optical fiber that has the structure illustrated in FIG. 1. FIGS. 4A to 4D are graphs that illustrate the relation between $\Delta 1$ and the confinement loss at a wavelength of 1530 nm in the higher-order mode of first order. The other design parameters are set in the same manner as those of FIGS. 2A to 2D. In other words, in FIG. 4A, $\Delta 3$ is fixed to −0.1%, Ra3 is fixed to 3.3; in FIG. 4B, $\Delta 3$ is fixed to −0.3% and Ra3 is fixed to 3.3; in FIG. 4C, $\Delta 3$ is fixed to −0.1% and Ra3 is fixed to 4.5; and in FIG. 4D, $\Delta 3$ is fixed to −0.3% and Ra3 is fixed to 4.5. Moreover, $2a$ is 11μm or 12.5μm and Ra2 is 2.06 or 2.7. Regarding a value of the confinement loss, "E" is a sign indicative of the exponential in decimal.

As illustrated in FIGS. 4A to 4D, the confinement loss is increased by decreasing Δ1, the absolute value of Δ3, 2a, and Ra3. Especially, when 2a is set large, a decrease in the confinement loss that occurs when Δ1 increases becomes remarkable. When 2a is set small, even if Ra3 is increased, the confinement loss maintains to be a high level.

As described above, although the optical characteristics of an optical fiber that has the structure illustrated in FIG. 1, such as the effective core area, the bending loss, and the confinement loss, have different dependencies with respect to the design parameters, it is possible to implement desired optical characteristics by combining the values of design parameters appropriately.

FIG. 5 is a table of the design parameters and the optical characteristics of optical fibers of calculation examples 1 to 27. "Aeff" indicates an effective core area at a wavelength of 1550 nm. A bending loss is a value at a wavelength of 1550 nm, and a confinement loss is the value of a confinement loss of the higher-order mode of first order at a wavelength of 1530 nm. Herein, it is considered that when the confinement loss at a wavelength of 1530 nm is equal to or greater than 20 dB/m, then the cable cut-off wavelength is equal to or less than 1530 nm.

In any of the optical fibers of the calculation examples 1 to 27 illustrated in FIG. 5, Δ1 is 0.17% to 0.24%, Δ3 is −0.3% to −0.1%, 2a is 11μm to 12.5μm, Ra2 is 2.0 to 2.7, and Ra3 is 3.3 to 4.5. As a result, in the optical fibers of the calculation examples 1 to 27, the effective core area is equal to or larger than 130μm$^2$, the bending loss is equal to of less than 100 dB/m and, what is more preferable, equal to or less than 20 dB/m. Moreover, in any of the optical fibers of the calculation examples 1 to 27, the confinement loss is equal to or greater than 20 dB/m and the cable cut-off wavelength is equal to or less than 1530 nm. The effective core area of the optical fiber of the calculation example 27 is especially large as 161μm$^2$.

FIG. 6 is a table of the design parameters and the optical characteristics of optical fibers of comparative calculation examples 28 to 43. The optical fibers of the comparative calculation examples 28 to 43 illustrated in FIG. 6 have an inappropriate design parameter. Therefore, for example, the bending loss is greater than 100 dB/m or the confinement loss is less; therefore, they have multi-mode transmission characteristics at a wavelength equal to or greater than 1530 nm and they do not have the desired optical characteristics.

An optical fiber of Example 1 of the present invention and an optical fiber of Comparative example 1 were produced. The optical fiber of Example 1 was produced using the design parameters of the calculation example 22 illustrated in FIG. 5 as an optical fiber that has Δ1 of 0.23%, Δ3 of −0.15%, 2a of 12μm, Ra2 of 2.06, and Ra3 of 3.47. The optical fiber of Comparative example 1 was produced as an optical fiber that has Δ1 of 0.20%, Δ3 of −0.15%, 2a of 12.7μm, Ra2 of 2.06, and Ra3 of 3.47.

Figures 7, 8:
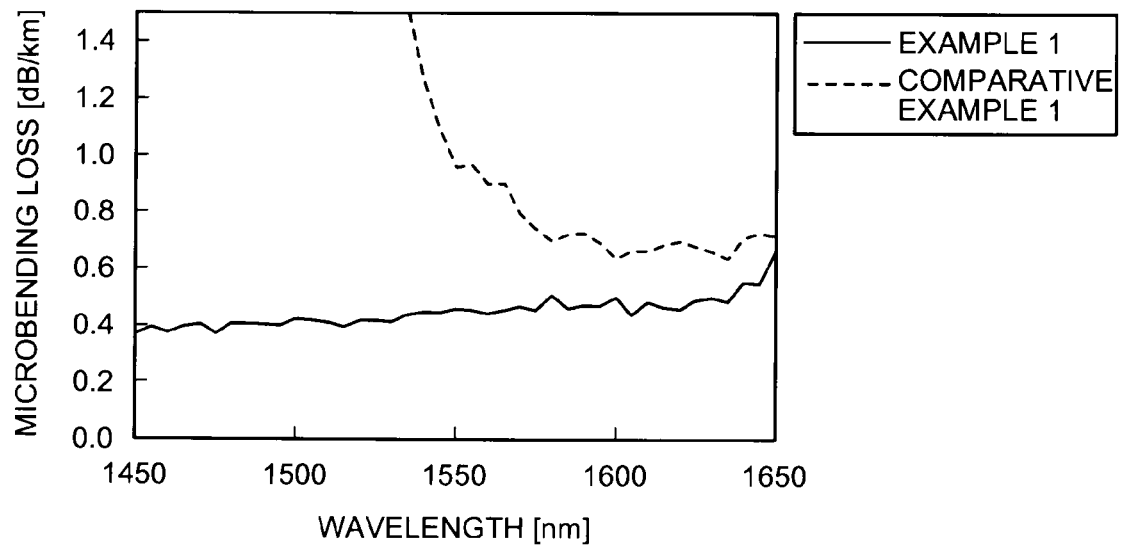
FIG. 7 is a table of characteristics of optical fibers of Example 1 and Comparative example 1.
FIG. 8 is a graph that illustrates wavelength dependencies of the microbending losses of the optical fibers of Example 1 and Comparative example 1.

FIG. 7 is a table of the characteristics of the optical fibers of Example 1 and Comparative example 1. In FIG. 7, the effective core area (Aeff), the bending loss, the chromatic dispersion, and the dispersion slope are values at a wavelength of 1550 nm. The "cut-off wavelength" indicates the cable cut-off wavelength.

As illustrated in FIG. 7, the cable cut-off wavelength of the optical fiber of Example 1 is 1330 nm, which is less than 1530 nm, the effective core area is 130μm$^2$, the bending loss is 15.6 dB/m, which is less than 20 dB/m, i.e., it has preferable characteristics. Moreover, the chromatic dispersion is 19.28 ps/nm/km, the dispersion slope is 0.062 ps/nm$^2$/km, i.e., they are practical values for a transmission optical fiber. In contrast, although the effective core area of the optical fiber of Comparative example 1 is large or 144.7μm$^2$, the cable cut-off wavelength is 1550 nm; therefore, the wavelength bandwidth in which light can transmit in a single mode is limited to 1550 nm or longer. The bending loss of the optical fiber of Example 1 is greater than the bending loss of the calculation example. This may be because the bending loss of Example 1 possibly includes microbending losses due to lateral pressures.

The optical fibers of Example 1, and Comparative example 1 was produced to have, as illustrated in FIG. 7, an outer diameter of the cladding portion (fiber outer diameter) greater than 125μm. Regarding the optical fibers of Example 1, and Comparative example 1, because the fiber outer diameter is greater than 125μm, the microbending loss is less although the effective core area is equal to or larger than 130μm$^2$.

The microbending losses of the optical fibers of Example 1 and Comparative example 1 were then measured. A microbending loss is defined, in this measurement, as the difference between the transmission loss of a target optical fiber when it is wound at a tension of 1N around a bobbin around which is wrapped with a number #1000 sandpaper and the transmission loss of the target optical fiber when it is bundled in a winding.

FIG. 8 is a graph that illustrates the wavelength dependencies of the microbending losses of the optical fibers of Example 1 and Comparative example 1. As illustrated in FIG. 8, the microbending loss of the optical fiber of Example 1, whose effective core area is 130μm$^2$, maintains a value equal to or less than 1 dB/km over a wide wavelength band from 1450 nm to 1650 nm where a single mode transmission is possible. Especially, the microbending loss at a wavelength of 1550 nm is small as 0.4 dB/km.

In contrast, the microbending loss of the optical fiber of Comparative example 1, whose effective core area is 144.7μm$^2$, is less than 1 dB/km or about 0.7 dB/km in a wavelength band longer than 1550 nm where a single mode transmission is possible. However, the microbending loss of the optical fiber of Comparative example 1 drastically increases in the wavelength side shorter than 1550 nm. The reason may be that, because the cable cut-off wavelength of the optical fiber of Comparative example 1 is 1550 nm, a transmission loss due to higher-order mode occurs on the shorter-wavelength side of 1550 nm and such transmission loss is measured as an apparent microbending loss.

A second embodiment of the present invention will be explained below. An optical fiber according to the second embodiment includes a cladding portion that contains holes. The holes decrease the microbending loss without substantially affecting the effective core area or the chromatic dispersion characteristics.

Figure 9:
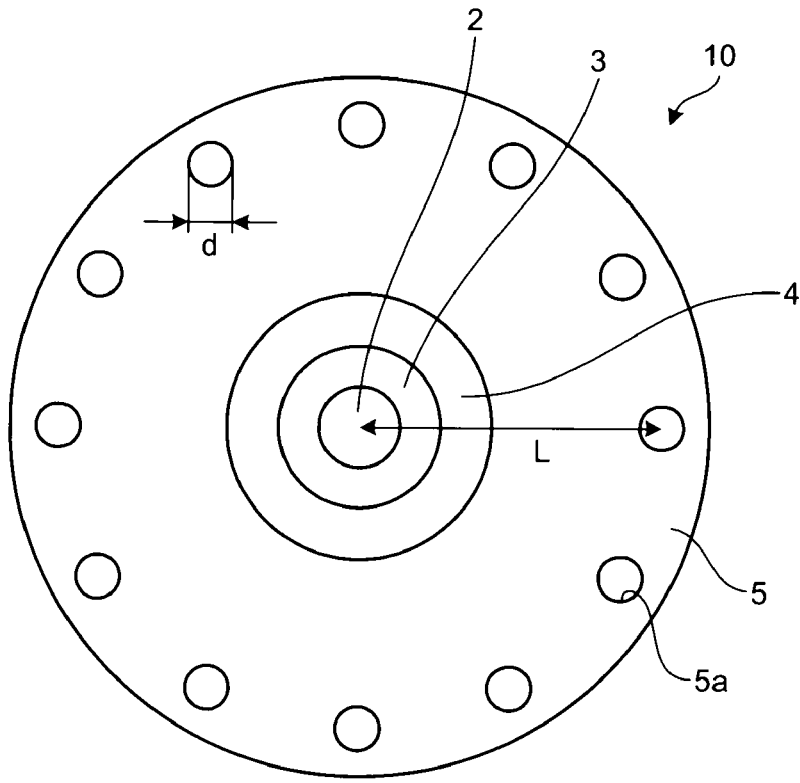
FIG. 9 is a schematic cross-sectional view of an optical fiber according to a second embodiment.

FIG. 9 is a schematic cross-sectional view of an optical fiber according to the second embodiment. As illustrated in FIG. 9, an optical fiber 10 has an almost identical structure to that of the optical fiber 1 of the first embodiment illustrated in FIG. 1 except that the cladding portion 5 includes twelve holes 5a that are formed at positions a predetermined distance away from the center core portion 2 so that the holes 5a are arranged in a circle whose center lies on the center of the center core portion 2, spaced an equal angle away from each other. The diameter of the holes 5a is d and the distance of the center of each of the holes 5a from the center of the center core portion 2 is L.

In the same manner as in the optical fiber of the first embodiment, if the optical fiber 10 of the second embodiment has, as the design parameters about the center core portion 2, the inner core layer 3, the outer core layer 4, and the cladding portion 5, Δ1 that is 0.17% to 0.24%, Δ3 that is −0.3% to −0.1%, 2a that is 11μm to 12.5μm, Ra2 that is 2.0 to 2.7, and Ra3 that is 3.3 to 4.5, then the effective core area at a wavelength of 1550 nm is equal to or larger than 130μm², the bending loss at a wavelength of 1550 nm is equal to or less than 100 dB/m, and the cable cut-off wavelength is equal to or less than 1530 nm.

When an optical fiber that has holes formed thereon, such as a well-known holey fiber, is discussed, the formed holes cause a refractive index difference between the holes and a glass area surrounded by the holes and, by using the refractive index difference, the optical fiber transmits light therethrough in a confined manner.

In contrast, the optical fiber 10 of the second embodiment performs confinement of light transmitting therethrough by using the refractive index profile of the center core portion 2, the inner core layer 3, the outer core layer 4, and the cladding portion 5 nearby the outer core layer 4. In addition, the distance L of the holes 5a is long enough so that the holes 5a do not substantially affect optical confinement using the above-described refractive index profile. In other words, the distance L is long enough so that the holes 5 do not substantially affect the effective core area or the chromatic dispersion characteristics that is defined by the refractive index profile formed with the center core portion 2, the inner core layer 3, the outer core layer 4, and the cladding portion 5 nearby the outer core layer 4.

As described above, the holes 5a of the optical fiber 10 do not substantially affect the effective core area or the chromatic dispersion characteristics. The holes 5a function as a buffer layer against a lateral pressure exerted on the optical fiber 10 and has, in the same manner as a primary coat of an optical fiber, a function of absorbing and dispersing a lateral pressure; therefore they decrease the microbending loss. As a result, the optical fiber 10 has, because of presence of the holes 5a, the effective core area as large as that of the optical fiber 1 of the first embodiment and has a less microbending loss. To decrease the microbending loss without substantially affecting the effective core area or chromatic dispersion characteristics, the hole diameter d of the holes 5a is preferably equal to or less than 10μm and the distance L is preferably equal to or longer than 25μm.

It is noted that when a ratio of the difference between the effective core area of the optical fiber 10 and the effective core area of an non-hole optical fiber that is almost identical to the optical fiber 10 but does not have the holes 5a (i.e., the optical fiber 1 of the first embodiment), to the effective core area of the optical fiber 1 is within a range of ±10%, or preferably equal to or less than ±5%, or when a ratio of the difference between the chromatic dispersion characteristic of the optical fiber 10 and the chromatic dispersion characteristic of the optical fiber 1, to the chromatic dispersion characteristic of the optical fiber 1 is within a range of ±10%, or preferably equal to or less than ±5%, then it is considered that the holes 5a do not substantially affect the effective core area or the chromatic dispersion characteristics of the optical fiber.

Figure 10:
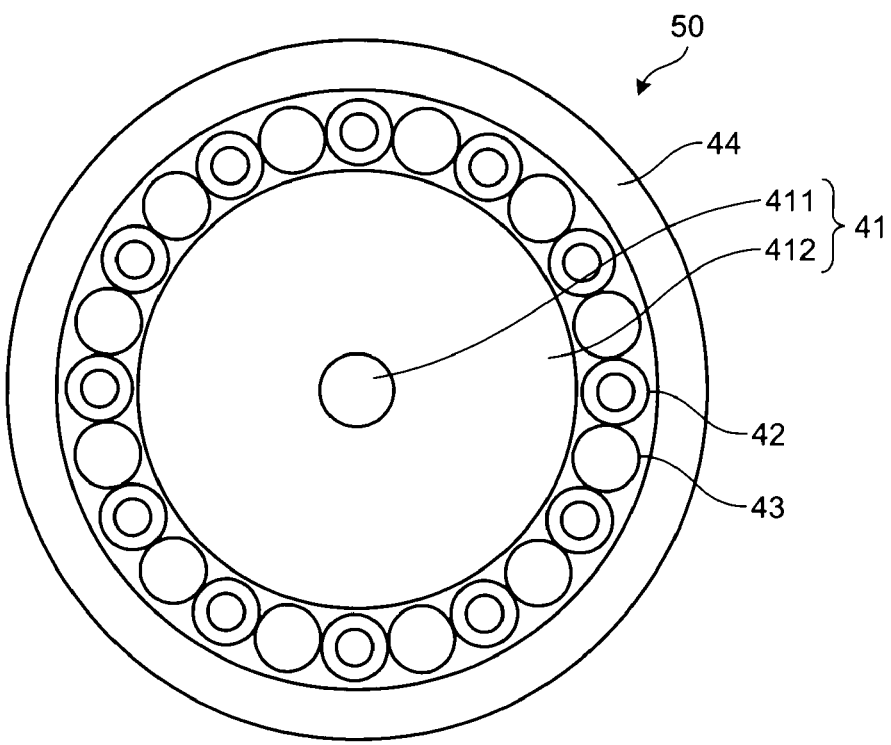
FIG. 10 is a diagram that explains an example of an optical-fiber producing method according to the second embodiment.

The optical fiber of the second embodiment can be produced, for example, in the following manner. FIG. 10 is a diagram that explains an example of the optical-fiber producing method according to the second embodiment. The following producing method involves, first of all, forming a glass preform 41 using a well-known VAD method or the like. The glass preform 41 includes a core forming portion 411, which is used to form the center core portion 2, the inner core layer 3, and the outer core layer 4, and a cladding forming portion 412, which is located around the outer circumference of the core forming portion 411 and is used to form a part of the cladding portion 5. Then, around the outer circumference of the glass preform 41 are arranged hollow glass capillaries 42, which are used to form the holes 5a, and solid glass rods 43, which are used to space the glass capillaries 42 a desired interval away from each other. The interval between the holes 5a of the optical fiber 10 is adjustable by changing the number of the glass rods 43 inserted between the glass capillaries 42 to, for example, one, two, three, . . . Then, a bundle of the glass preform 41, the glass capillaries 42, and the glass rods 43 is inserted to a glass tube 44, thereby forming a glass preform 50. After that, the glass preform 50 is drawn by a well-known drawing machine and thus the optical fiber 10 illustrated in FIG. 9 is produced.

The optical-fiber producing method according to the second embodiment is not limited to the above. For example, an optical fiber can be produced by drilling holes on the glass preform 41 using a drill or the like and then drawing the glass preform 41.

The design parameters and calculation example of the optical characteristics of an optical fiber according to the second embodiment will be explained below by comparing them with those of an optical fiber according to the first embodiment. FIG. 11 is a table of the design parameters and the optical characteristics of optical fibers of calculation examples 44 and 45. The calculation example 44 has, like the first embodiment, a cross-sectional structure that does not have holes; and the calculation example 45 has, like the second embodiment, has a cross-sectional structure that has holes formed thereon. The value of each of the optical characteristics is a value at a wavelength of 1550 nm. Regardless of whether holes are present or not, there are not so much differences between the optical fiber of the calculation example 44 and the optical fiber of the calculation example 45 on the optical characteristics listed in FIG. 11.

Figure 13:
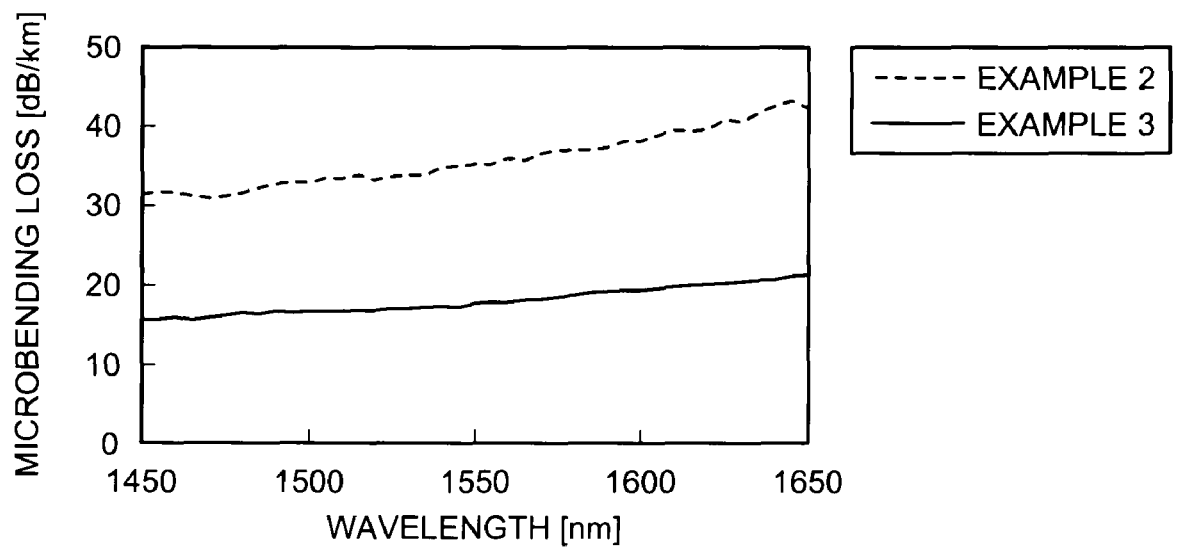
FIG. 13 is a graph that illustrates the wavelength dependencies of the microbending losses of the optical fibers of Examples 2 and 3.

FIG. 12 is a table of the optical characteristics of optical fibers of Examples 2 and 3 that were produced by using the above producing method. The optical fiber of Example 2 has the design parameters of the calculation example 44 and the optical fiber of Example 3 has the design parameters of the calculation example 45. The fiber outer diameter of the optical fibers of Examples 2 and 3 is 125μm. FIG. 13 is a graph that illustrates the wavelength dependencies of the microbending losses of the optical fibers of Examples 2 and 3. The value of each of the optical characteristics illustrated in FIGS. 12 and 13 is a value at a wavelength of 1550 nm.

As illustrated in FIGS. 12 and 13, when the optical characteristics of the optical fiber of Example 2 are compared with the optical characteristics of the optical fiber of Example 3, regardless of whether holes are present or not, there is not so much difference between, for example, the effective core areas. However, the microbending loss of the optical fiber with holes of the calculation example 45 and Example 3 is decreased largely.

Although the number of holes of an optical fiber according to the second embodiment is twelve, the number of holes is not limited thereto. For decreasing microbending loss isotropically, twelve or more holes are preferable. For an easy hole production, 36 or less holes are preferable.

The optical fiber according to the present invention is not limited to the above embodiments. For example, to implement the trench index profile illustrated in FIG. 1, it is allowable to form the center core portion with silica glass that contains a dopant, such as germanium (Ge), to increase the refractive index, form the inner core layer and the cladding portion with pure silica glass, and form the outer core layer with silica glass that contains a dopant to decrease the refractive index.

Although, in the above embodiments, the refractive index of the inner core layer is equal to the refractive index of the cladding portion, the refractive index of the inner core layer can be substantially equal to the refractive index of the cladding portion, i.e., a difference is allowable as long as it does not affect the effects of the present invention.

As set forth hereinabove, an optical fiber according to the present invention is suitable for application in optical communications.

Additional advantages and modifications will readily occur to those skilled in the art. Therefore, the disclosure in its broader aspects is not limited to the specific details, representative embodiments and alternate examples shown and described herein. Accordingly, various modifications may be made without departing from the spirit or scope of the general inventive concept as defined by the appended claims and their equivalents. Furthermore, the above-mentioned embodiments and the alternate examples can be arbitrarily combined with one another.

What is claimed is:

1. An optical fiber comprising:
   a center core portion;
   an inner core layer that is formed around an outer circumference of the center core portion, a refractive index of the inner core layer being less than that of the center core portion;
   an outer core layer that is formed around an outer circumference of the inner core layer, a refractive index of the outer core layer being less than that of the inner core layer; and
   a cladding portion that is formed around an outer circumference of the outer core layer, wherein a refractive index of the cladding portion is substantially equal to that of the inner core layer, wherein
   an effective core area at a wavelength of 1550 nm is equal to or larger than 130μm$^2$, a bending loss at a wavelength of 1550 nm is equal to or less than 100 dB/m when the optical fiber is bent with a diameter of 20 mm, and a cable cut-off wavelength is equal to or less than 1530 nm.

2. The optical fiber according to claim 1, wherein when a relative refractive-index difference of the center core portion to the cladding portion is Δ1, a relative refractive-index difference of the outer core layer to the cladding portion is Δ3, a diameter of the center core portion is 2a, an outer diameter of the inner core layer is 2b, an outer diameter of the outer core layer is 2c, b/a is Ra2, and c/a is Ra3, then Δ1 is 0.17% to 0.24%, Δ3 is −0.3% to −0.1%, 2a is 11μm to 12.5μm, Ra2 is 2.0 to 2.7, and Ra3 is 3.3 to 4.5.

3. The optical fiber according to claim 1, wherein an outer diameter of the cladding portion is greater than 125 μm and a microbending loss at a wavelength of 1550 nm is equal to or less than 1 dB/km.

4. The optical fiber according to claim 1, wherein the cladding portion includes a hole to decrease the microbending loss at a position away from the center core portion so that the hole does not substantially affect an effective core area or an chromatic dispersion characteristics defined by a refractive index profile formed with the center core portion, the inner core layer, the outer core layer, and the cladding portion near the outer core layer.

5. The optical fiber according to claim 4, wherein
   a ratio of a difference between the effective core area of the optical fiber and an effective core area of a non-hole optical fiber that is almost same as the optical fiber but does not have the hole, to the effective core area of the non-hole optical fiber that is almost same as the optical fiber but does not have the hole is within a range of ±10% or
   a ratio of a difference between the chromatic dispersion characteristic of the optical fiber between a chromatic dispersion characteristic of a non-hole optical fiber that is almost same as the optical fiber but does not have the hole, to the chromatic dispersion characteristic of the non-hole optical fiber that is almost same as the optical fiber but does not have the hole is within a range of ±10%.

6. The optical fiber according to claim 4, wherein
   the cladding portion includes 36 or less of the holes
   the diameter of each of the holes is less than or equal to 10μm, and
   a center of each of the holes is spaced 25μm or more away from a center of the core portion.

* * * * *